United States Patent
Peng et al.

(10) Patent No.: US 11,875,787 B2
(45) Date of Patent: *Jan. 16, 2024

(54) SYNTHETIC DATA GENERATION FOR TRAINING OF NATURAL LANGUAGE UNDERSTANDING MODELS

(71) Applicant: Microsoft Technology Licensing, LLC, Redmond, WA (US)

(72) Inventors: Baolin Peng, Bellevue, WA (US); Chenguang Zhu, Sammamish, WA (US); Chunyuan Li, Issaquah, WA (US); Xiujun Li, Seattle, WA (US); Jinchao Li, Redmond, WA (US); Nanshan Zeng, Bellevue, WA (US); Jianfeng Gao, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/963,766

(22) Filed: Oct. 11, 2022

(65) Prior Publication Data

US 2023/0076095 A1 Mar. 9, 2023

Related U.S. Application Data

(63) Continuation of application No. 17/021,892, filed on Sep. 15, 2020, now Pat. No. 11,508,360.

(51) Int. Cl.
*G10L 15/18* (2013.01)
*G10L 15/22* (2006.01)
*G10L 15/08* (2006.01)

(52) U.S. Cl.
CPC ............ *G10L 15/18* (2013.01); *G10L 15/083* (2013.01); *G10L 15/22* (2013.01)

(58) Field of Classification Search
CPC ........ G10L 15/18; G10L 15/083; G10L 15/22
USPC ............................................................. 704/9
See application file for complete search history.

(56) References Cited

U.S. PATENT DOCUMENTS

| | | | |
|---|---|---|---|
| 10,783,456 B2 * | 9/2020 | Strope | G06N 5/04 |
| 11,295,092 B2 * | 4/2022 | Freitag | G10L 13/00 |
| 11,508,360 B2 * | 11/2022 | Peng | G06F 40/284 |

* cited by examiner

*Primary Examiner* — Susan I McFadden
(74) *Attorney, Agent, or Firm* — Rainier Patents, P.S.

(57) ABSTRACT

This document relates to machine learning. One example includes a method or technique that can be performed on a computing device. The method or technique can include obtaining a task-semantically-conditioned generative model that has been pretrained based at least on a first training data set having unlabeled training examples and semantically conditioned based at least on a second training data set having dialog act-labeled utterances. The method or technique can also include inputting dialog acts into the semantically-conditioned generative model and obtaining synthetic utterances that are output by the semantically-conditioned generative model. The method or technique can also include outputting the synthetic utterances.

22 Claims, 12 Drawing Sheets

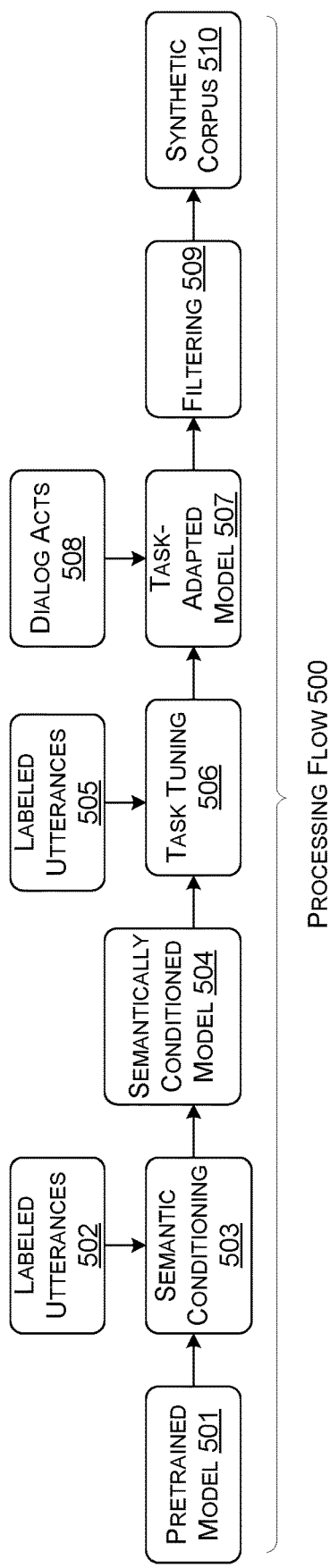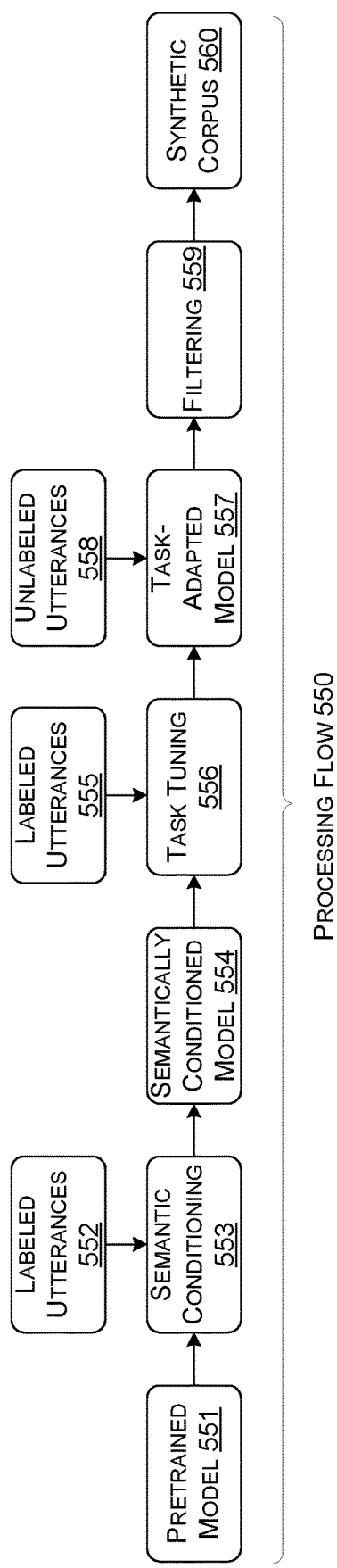

SYNTHETIC DATA GENERATION FOR TRAINING OF NATURAL LANGUAGE UNDERSTANDING MODELS

BACKGROUND

Machine learning can be used to perform a broad range of tasks, such as natural language processing, financial analysis, and image processing. Machine learning models can be trained using several approaches, such as supervised learning, semi-supervised learning, unsupervised learning, reinforcement learning, etc. In approaches such as supervised or semi-supervised learning, labeled training examples can be used to train a model to map inputs to outputs. In unsupervised learning, models can learn from patterns present in an unlabeled dataset.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for training and utilization of machine learning models. One example includes a method or technique that can be performed on a computing device. The method or technique can include obtaining a task-adapted generative model that has been tuned using one or more task-specific seed examples. The method or technique can also include inputting dialog acts into the task-adapted generative model and obtaining synthetic utterances that are output by the task-adapted generative model. The method or technique can also include populating a synthetic training corpus with synthetic training examples that include the synthetic utterances. The synthetic training corpus may be suitable for training a natural language understanding model.

Another example includes a system having a hardware processing unit and a storage resource storing computer-readable instructions. When executed by the hardware processing unit, the computer-readable instructions can cause the hardware processing unit to generate synthetic training examples for a particular task using a task-adapted generative model tuned for the particular task. The computer-readable instructions can cause the hardware processing unit to populate a synthetic training corpus with the synthetic training examples.

Another example includes a method or technique that can be performed on a computing device. The method or technique can include obtaining a pretrained generative model that has been pretrained using a first training data set having unlabeled training examples. The method or technique can also include semantically conditioning the pretrained generative model based at least on a second training data set having dialog act labeled utterances to obtain a semantically-conditioned generative model. The method or technique can also include tuning the semantically-conditioned generative model using a third training data set having task-specific seed examples to obtain a task-adapted generative model. The method or technique can also include outputting the task-adapted generative model.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIGS. 5A and 5B illustrate example processing flows for generating a synthetic training corpus, consistent with some implementations of the present concepts.

DETAILED DESCRIPTION

Machine Learning Description

Figure 1:
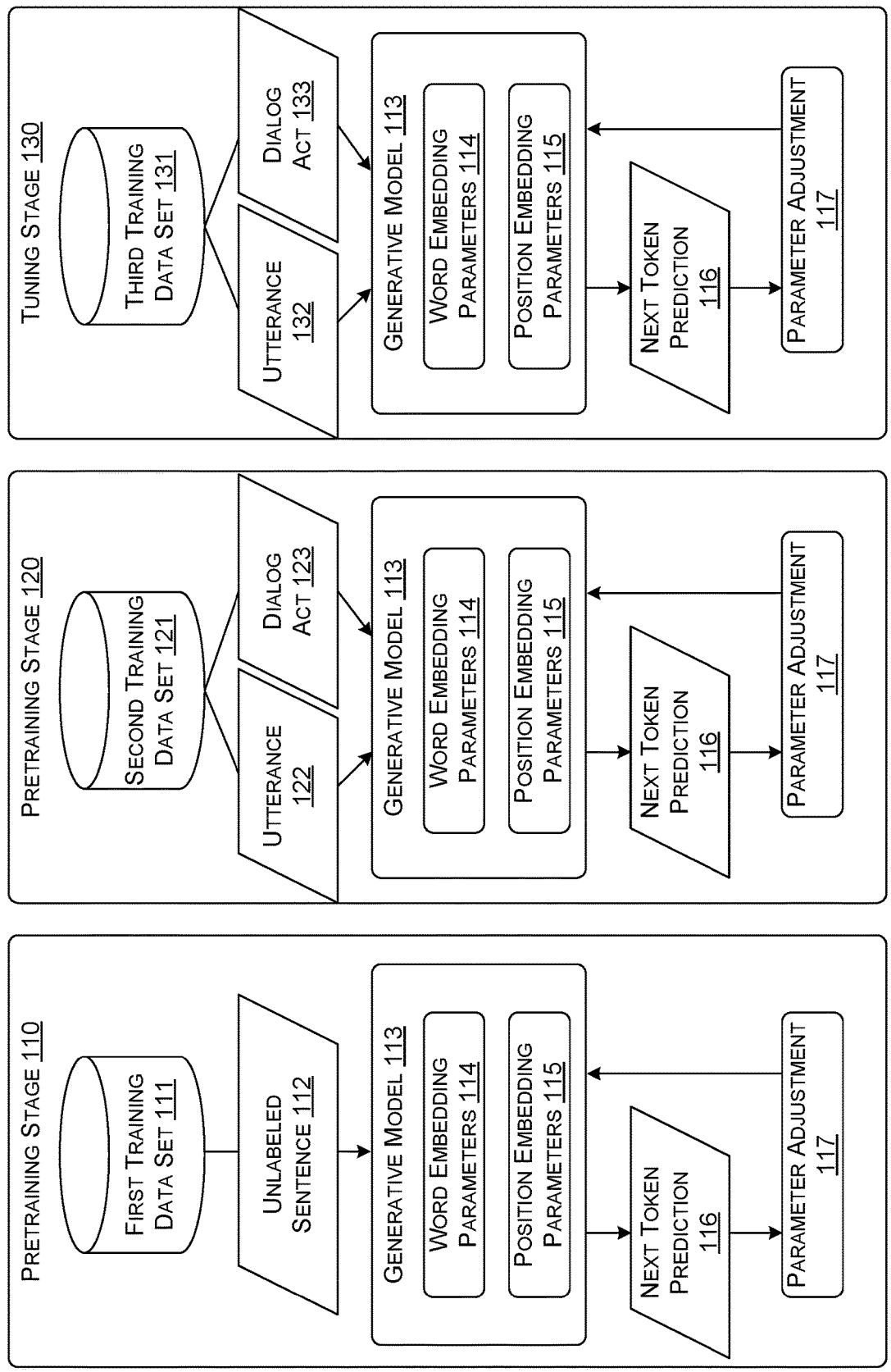
FIG. 1 illustrates examples of pretraining or tuning stages for a machine learning model, consistent with some implementations of the present concepts.

There are various types of machine learning frameworks that can be trained to perform a given task. Support vector machines, decision trees, and neural networks are just a few examples of machine learning frameworks that have been used in a wide variety of applications, such as image processing and natural language processing. Some machine learning frameworks, such as neural networks, use layers of nodes that perform specific operations.

In a neural network, nodes are connected to one another via one or more edges. A neural network can include an input layer, an output layer, and one or more intermediate layers. Individual nodes can process their respective inputs according to a predefined function, and provide an output to a subsequent layer, or, in some cases, a previous layer. The inputs to a given node can be multiplied by a corresponding weight value for an edge between the input and the node. In addition, nodes can have individual bias values that are also used to produce outputs. Various training procedures can be applied to learn the edge weights and/or bias values. The term "parameters" when used without a modifier is used herein to refer to learnable values such as edge weights and bias values that can be learned by training a machine learning model, such as a neural network.

A neural network structure can have different layers that perform different specific functions. For example, one or more layers of nodes can collectively perform a specific operation, such as pooling, encoding, or convolution operations. For the purposes of this document, the term "layer" refers to a group of nodes that share inputs and outputs, e.g., to or from external sources or other layers in the network. The term "operation" refers to a function that can be performed by one or more layers of nodes. The term "model structure" refers to an overall architecture of a layered model, including the number of layers, the connectivity of the layers, and the type of operations performed by individual layers. The term "neural network structure" refers to the model structure of a neural network. The term "trained model" and/or "tuned model" refers to a model structure together with parameters for the model structure that have been trained or tuned. Note that two trained models can share the same model structure and yet have different values for the parameters, e.g., if the two models are trained on different training data or if there are underlying stochastic processes in the training process.

There are many machine learning tasks for which there is a relative lack of training data. One broad approach to training a model with limited task-specific training data for a particular task involves "transfer learning." In transfer learning, a model is first pretrained on another task for which significant training data is available, and then the model is tuned to the particular task using the task-specific training data.

The term "pretraining," as used herein, refers to model training on a set of pretraining data to adjust model parameters in a manner that allows for subsequent tuning of those model parameters to adapt the model for one or more specific tasks. In some cases, the pretraining can involve a self-supervised learning process on unlabeled training data, where a "self-supervised" learning process involves learning from the structure of pretraining examples, potentially in the absence of explicit (e.g., manually-provided) labels. Subsequent modification of model parameters obtained by pretraining is referred to herein as "tuning." Tuning can be performed for one or more tasks using supervised learning from explicitly-labeled training data, in some cases using a different task for tuning than for pretraining.

Machine Learning Models for Natural Language Processing

Machine learning models for natural language processing include natural language understanding models, which aim to infer information from natural language, and natural language generation or "generative" models, which aim to produce natural language based on some input. Training examples for natural language understanding models can be oriented to a particular task. For instance, to train a natural language understanding model to understand user utterances requesting travel to different destinations, a task-specific corpus of labeled training examples can be used. Such a corpus can include various example human-labeled user utterances, where the labels can include intent labels (e.g., book flight, find public transport, etc.) and slot labels (e.g., departure and arrival destinations). Note that, for the purposes of this document, the term "utterance" encompasses not only words spoken by a user or machine, but also words conveyed using text, sign language, etc.

In many cases, insufficient human-labeled training examples are readily available for training task-adapted language understanding models. In other words, a model trained using only the available examples will likely exhibit poor performance when employed for the corresponding task. The disclosed implementations offer an approach for using generative models to create synthetic task-specific training examples that can be used in place of, or in addition to, training examples created by actual users. For the purposes of this document, the term "synthetic" means at least partly machine-generated. Using a generative model to generate training data for a natural language understanding model, as described herein, can provide large quantities of suitable training data at relatively low cost, because the synthetic training examples do not need to be labeled by human users.

Existing techniques for training a generative model do not necessarily produce generative models that are particularly useful for generating task-specific training examples. For instance, one way to perform unsupervised training of a generative model involves training the model to predict the next word in a sequence given the previous words already seen by the model. However, when the training data used for such a generative model is a general-purpose corpus, (e.g., Wikipedia articles, books, web articles, etc.), the trained generative model learns to generate text similar to the text in the general-purpose corpus. While such an approach can be used to obtain generative models that produce reasonable utterances, such models may lack utility for specific natural language scenarios.

For instance, "dialog acts" have a great deal of utility for user-facing applications, such as interactive BOTs or digital assistants. Such automated applications can use natural language understanding models to interpret received user utterances, e.g., infer intent and slot values from words spoken or typed by a user. In addition, these automated applications can use generative models to generate response utterances to the user.

However, a generative model trained on a general-purpose corpus (e.g., Wikipedia articles) may not be particularly adept at generating synthetic utterances suitable for dialog acts in user-facing scenarios. Moreover, synthetic utterances generated by such a model may not be very similar to user requests for dialog-based systems, and thus might not be particularly useful as synthetic training data for natural language understanding models that will be employed to understand user dialog.

The disclosed implementations offer mechanisms that can be used to generate synthetic training data for natural language understanding models. The approaches disclosed herein utilize generative models that are trained in a manner that adapts the generative models for a particular task. Once adapted to the task, such a generative model may be suitable for generating synthetic utterances that can be used alone or in conjunction with human-generated utterances to train a natural language understanding model.

As discussed more below, the disclosed implementations can start by performing a first pretraining stage on a generative model using a first training data set, such as large, general-purpose corpus of unlabeled natural language examples. For instance, the first training data set can include Wikipedia articles, books, web articles, or other documents from a range of subject domains. This trains the generative model to produce natural language that may be reasonably understandable to a human being, but not necessarily suitable for conducting a dialog with a human user. Next, a second pretraining stage can be employed on a second training data set, such as a corpus of natural language examples with corresponding labeled dialog acts (e.g., intents and slots) for a broad range of task domains. Here, the generative model learns how to conduct a general dialog with a user, e.g., by responding to a question with an answer, confirming information received from a user, asking clarifications, performing an action requested by the user, and so on.

Once pretrained as described above, the generative model can be tuned to a new task domain using a third training data set, e.g., a smaller task-specific set of seed utterances labeled with task-specific dialog acts. For example, the seed utterances can be tailored to a particular application, such as a travel application or restaurant application. The intents and/or slots in the third training data set for the particular task can be novel, i.e., not present at all in the second training data set, or can be sparsely represented in the second training data set. This tuning stage adapts the generative model to generate utterances that are suitable to the new task domain. A generative model pretrained and tuned in this fashion may be capable of generating large numbers of high-quality synthetic training examples for the new task domain, thus reducing the cost of training natural language understanding models by utilizing fewer human-generated examples.

Example Training Stages

FIG. 1 illustrates three example stages for training a generative model to produce task-specific synthetic training examples. The example stages include pretraining stage 110, pretraining stage 120, and tuning stage 130, as described more below.

Pretraining stage 110 involves accessing a first training data set 111 (e.g., a general text corpus) and extracting an unlabeled sentence 112. The first training data set can include encyclopedia articles, news articles, blog posts, etc., and many or all of the sentences in the general text corpus may lack corresponding dialog act labels. Next, the unlabeled sentence is input sequentially into a generative model 113, one token at a time. As used herein, the term "token" refers to a word or part of a word, potentially with one or more symbols added thereto. Based on model parameters such as word embedding parameters 114 and/or position embedding parameters 115, the generative model outputs a next token prediction 116 for the next token of the unlabeled sentence. The next token prediction is based on the preceding context, e.g., the previous tokens in the sentence. Then, parameter adjustment 117 is performed on the parameters of the generative model based on the difference between the prediction by the generative model and the next token in the unlabeled sentence. Pretraining stage 110 can be performed on each sentence in the first training data set 111.

Pretraining stage 120 involve accessing a second training data set 121 and extracting an utterance 122 and a correspond dialog act 123. For instance, the second training data set can include a corpus of dialog act-labeled utterances. The second training data set can include a wide range of utterances and corresponding intents and slot labels for the utterances, where each dialog act label corresponds to at least one intent and one or more slot values. The utterances, intents, and slot labels can correspond to a wide range of task domains, e.g., for ordering food, airline travel, requesting public transportation, performing financial transactions, etc.

The utterance 122 and the dialog act 123 are input to the generative model 113 one token at a time, as described above with respect to Pretraining Stage 110. The generative model predicts the next token in the sentence given the previous tokens and the dialog act. The parameters of the generative model are adjusted based on the difference between the prediction by the generative model and the next token in the utterance. Thus, in Pretraining Stage 120, each token prediction is semantically conditioned on the corresponding dialog act. In other words, the generative model outputs the predicted next token for the utterance given not only the preceding tokens in the utterance, but also the intent and/or slot values for the dialog act.

Tuning stage 130 involves accessing a third training data set 131 and extracting an utterance and a corresponding dialog act. For instance, the third training data set can include task-specific seed examples for a particular task. Each seed example can include a corresponding dialog act with intent and/or slot labels that are not present or are sparsely represented in the second training data set 121. The intents, slots, and utterances in the third training data set can be specific to a particular task domain, e.g., such as reviewing items on a web page, and can include intents such as "review" and slot values such as one star, two star, three stars, and so on.

The utterance 132 and the dialog act 133 are input to the generative model 113 one token at a time, as described above. The generative model predicts the next token in the utterance given the previous tokens and the dialog act. The parameters of the generative model are adjusted based on the difference between the prediction by the generative model and the next token in the utterance. Thus, as in Pretraining Stage 120, each next token prediction is conditioned on the corresponding dialog act.

Generally, pretraining stage 110 can operate to pretrain the generative model to learn initial word embeddings and relationships between individual words, so that the generative model can produce reasonably coherent natural language sentences. Pretraining stage 120 can operate to further pretrain the model to learn how to output utterances corresponding to a wide range of dialog acts. Tuning stage 130 can operate to tune the model to learn how to generate task-specific utterances for a new task given a relatively limited set of task-specific seed examples.

Example Model Inputs and Outputs

Figure 2:
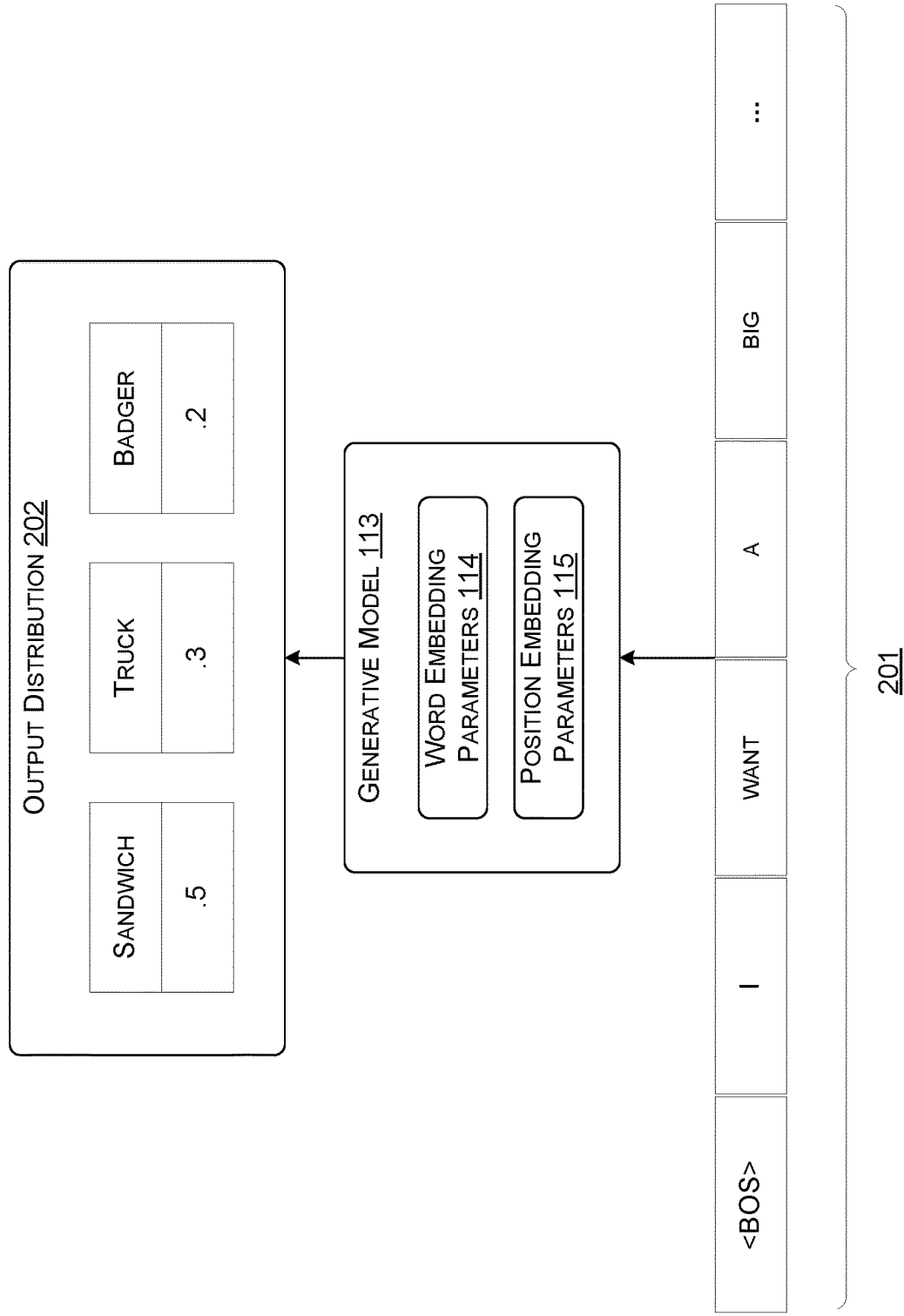
FIG. 2 illustrates an example data flow for a pretraining stage using a training data set that lacks dialog act labels, consistent with some implementations of the present concepts.

FIG. 2 illustrates an example of data flow for pretraining stage 110. Referring back to FIG. 1, assume the unlabeled sentence 201 "I want a big truck" is retrieved from the first training data set 111. FIG. 2 illustrates a model state after the first four words of the sentence have been processed by the generative model 113. Thus, context 201 for the next token prediction includes five tokens—start token <BOS> and the four words "I want a big."

In this example, the generative model 113 produces an output distribution 202 with the predicted probability of 0.5 for the next word "sandwich," 0.3 for the next word "truck," and 0.2 for the next word "badger." Since the next token in the example sentence is "truck," the model parameters will be adjusted based on a loss that is proportional to the difference between the model output and the correct next token. Generally, this should cause the generative model to increase the probability of the word "truck" and reduce the probability of "sandwich" and "badger" the next time the model sees the context vector "I want a big . . . ."

Figure 3:
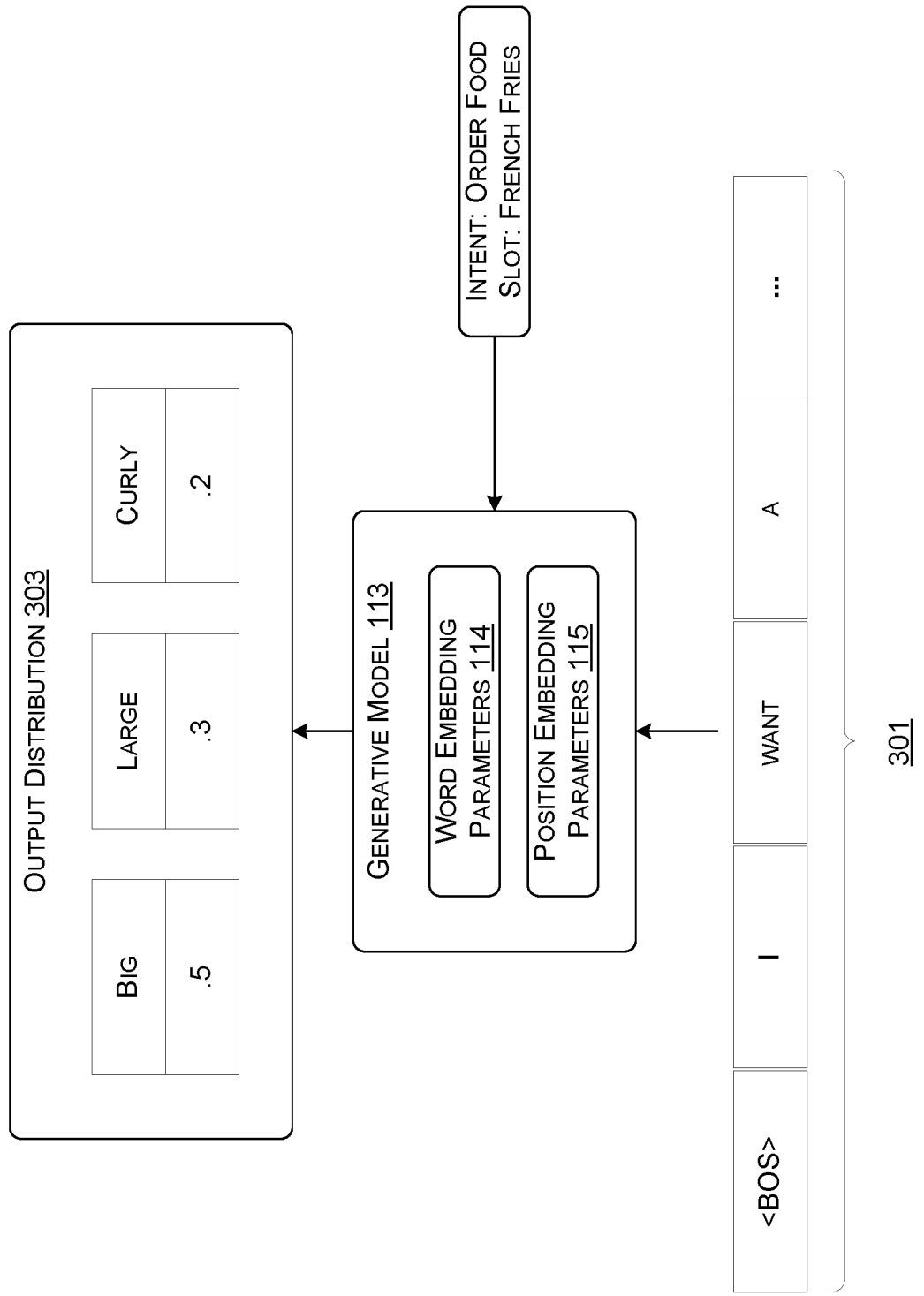
FIG. 3 illustrates an example data flow for pretraining or tuning stages using a training data set that has dialog act labels, consistent with some implementations of the present concepts.

FIG. 3 illustrates an example of data flow for pretraining stage 120 and/or tuning stage 130. Referring back to FIG. 1, for this example assume the utterance "I want a large order of fries" is retrieved from the second training data set 121 (for pretraining stage 120) or from the third training data set 131 (for tuning stage 130). FIG. 3 illustrates a state after the first three words of the utterance have been processed by the generative model 113. Thus, context 301 for the next token prediction four tokens—start token <BOS> and the three words "I want a." The prediction is conditioned on dialog act 302, which includes the intent value "order food" and the slot value "French fries."

In this example, the generative model 113 produces an output distribution 303 with the predicted probability of 0.5 for the next word "big," 0.3 for the next word "large," and 0.2 for the next word "curly." Since the next word in the example utterance is "large," the model parameters will be adjusted by propagating loss that is proportional to the difference between the model output and the correct next token. Generally, this should cause the model to increase the probability of the word "large" and reduce the probability of "big" and "curly" the next time the model sees the context vector "I want a ... " with the intent of "order food" and the slot value of "French fries."

Example Generative Model Structure

Figure 4:
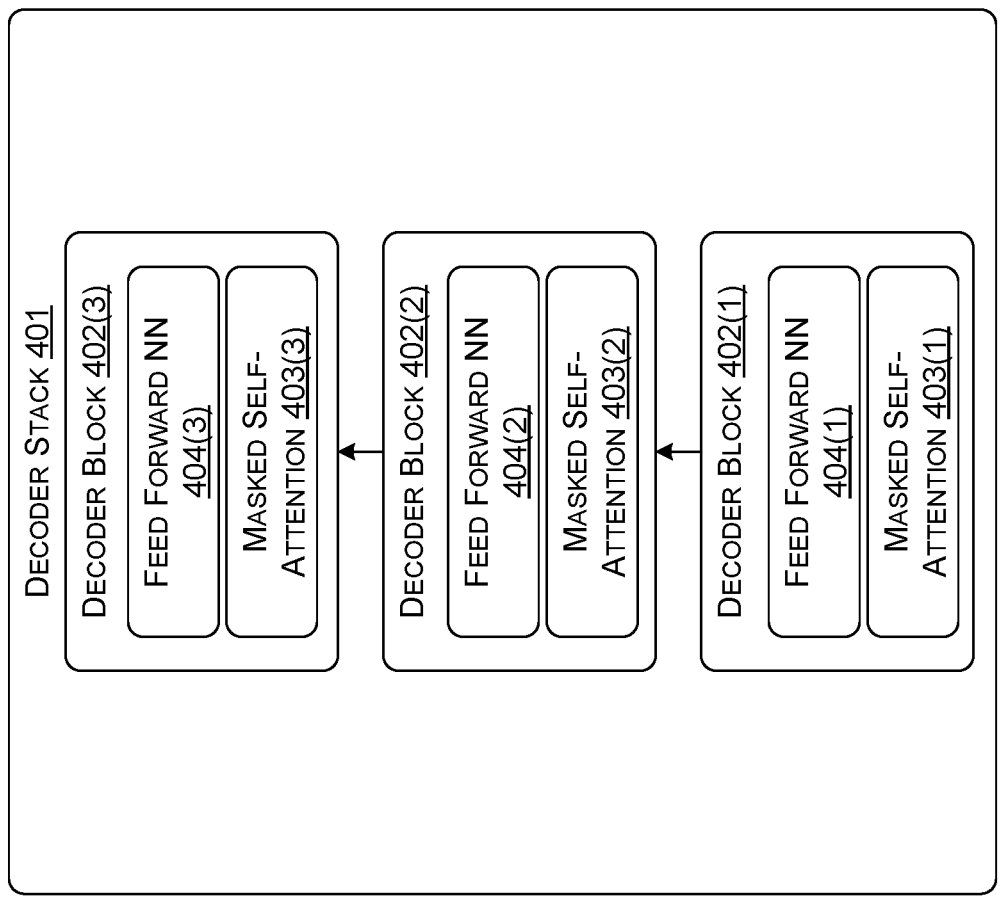
FIG. 4 illustrates an example decoder that can be employed in a generative model, consistent with some implementations of the present concepts.

Some implementations may use generative models that include transformer decoders. FIG. 4 illustrates an example decoder stack 401 that includes three decoder blocks 402(1), 402(2), and 402(3). Each decoder block can have a corresponding masked self-attention layer 403(1), 403(2), and 403(3), as well as a corresponding feed-forward neural network 404(1), 404(2), and 404(3). The masked self-attention layers can mask off future tokens in training, e.g., the context for each training iteration is a prefix of the token position being predicted. The output of the masked self-attention layers for each token can be an attention-weighted sum of the representations of the context tokens from the preceding layer, where the attention weights represent the relative importance of each context token to the token whose representation is being generated. Both the masked self-attention layers and feed-forward neural network layers can have parameters that are adjusted during pretraining and/or tuning.

The lowest-layer decoder can receive token and position embeddings at each iteration and pass its decoded output up to the next-layer decoder until a final decoded output is produced. The decoded output can be used to obtain a probability distribution for the next token in the input sequence, as described above with respect to FIGS. 2 and 3.

Training Algorithm Details

The following section provides a formal explanation of the pretraining and tuning stages described above. Additional information on training algorithms and experimental results are available at Peng, et al., "*Few-shot Natural Language Generation for Task-Oriented Dialog,*" 2020, https://arxiv.org/abs/2002.12328, which is incorporated herein by reference and authored by certain inventors of this patent application.

A dialog act can be defined as the combination of intent and slot-value pairs $\{(s_i, v_i)\}_{i=1}^{P}$:

$$\mathcal{A} = [\underbrace{I}_{Intent}, \underbrace{(s_1, v_1), \ldots, (s_P, v_P)}_{Slot\text{-}value\,pairs}] \quad (1)$$

where P is the number of pairs, which varies in different dialog acts.
- Intents can be used to distinguish different types of system actions. Example intents include inform, request, confirm, select
- Slot-value pairs can indicate the category and content of the information to express in a generated utterance, respectively.

The goal of a natural language generation module (e.g., a generative model) can be defined as translation into a natural language response=$[x_1, \ldots, x_T]$, where T is the sequence length. For example, given the dialog act: confirm (name=Hilton, area=center), the corresponding natural language response generated by the natural language generation module can be "Let me confirm that you are searching for Hilton in the center area".

Semantically Conditioned Generative Pre-Training

Natural language generation for dialog acts can be achieved using neural network-based language models that are conditioned on dialog acts. Given training data of N samples $D=\{(\mathcal{A}_n, x_n)\}_{n=1}^{N}$, the disclosed techniques can be used to build a statistical model parameterized by $\Theta$ to characterize $p_\theta(x|\mathcal{A})$. To leverage the sequential structure of response, the joint probability of x can be decomposed using the chain rule, casting an auto-regressive generation process as follows:

$$p_\theta(x|\mathcal{A}) = \prod_{t=1}^{T} P_\theta(x_t | x_{<t}, \mathcal{A}) \quad (2)$$

where $x_{<t}$ indicates all tokens before t.

Learning can be performed by maximizing the log-likelihood (MLE) of the conditional probabilities in (2) over the entire training dataset:

$$\mathcal{L}_\theta(D) = \sum_{n=1}^{|D|} \sum_{t=1}^{T_n} \log p_\theta(x_{t,n} | x_{<t,n}, \mathcal{A}_n) \quad (3)$$

For example, transformers can be used to parameterize the conditionals in (2). For additional information on transformers, see Vaswani et al., "*Attention is all you need,*" In Advances in Neural Information Processing Systems, pp. 5998-6008, 2017. To enable strong generalization and controllable ability for the learned model, the three-stage procedure described above in FIG. 1 can be employed.

First Pretraining Stage

Large models trained on a massive training corpus often generalize well to new domains. Some implementations are based on the GPT-2 architecture as a generative model that can be pretrained as disclosed herein, e.g., with respect to pretraining stage 110 shown in FIG. 1. GPT-2 is further described in Radford et al, "*Language models are unsupervised multitask learners,*" OpenAI, 2019, incorporated herein by reference. GPT-2 is an auto-regressive language model that leverages 12-24 layers of masked, multi-head self-attention transformers. GPT-2 can be pre-trained on a large set of text data, such as OpenWebText. GPT-2 provides good performance on characterizing human language data distribution and knowledge transfer. Given text prompts, GPT-2 can generate realistic sentences.

Second Pretraining Stage

To enable the guidance of dialog acts in response generation, a generative model such as GPT-2 can be continuously pre-trained on large amounts of annotated (dialog act, response) pairs. The pre-training dataset can include annotated training pairs from various corpuses, such as Schema-Guided Dialog corpus, MultiWOZ corpus, Frame corpus, and Facebook Multilingual Dialog Corpus.

Dialog acts can be pre-processed into a sequence of control codes using the following format:

$$\mathcal{A}' = [I(s_1 = v_1, \ldots s_P = v_P)] \quad (4)$$

Meanwhile, the output sequence $\mathcal{A}'$ can be pre-processed via appending with a special start token [BOS] and an end token [EOS]. Finally, the dialog act $\mathcal{A}'$ is concatenated with its augmented response $\mathcal{A}'$, and then fed into the generative model. During training, the prediction loss is only computed for $\mathcal{A}'$, and $\mathcal{A}'$ provides the attended conditions. The dialog act represents the semantics of the generated sentences. The following description uses the abbreviation "SC-GPT" to refer to a semantically-conditioned model that was pretrained using generative pre-training as disclosed herein.

Task-Specific Fine Tuning

For a new domain, a dialog act may include novel intents or slot-value pairs that the model has not seen during pretraining. In addition, the number of annotated training samples may be limited. Thus, the disclosed implementations can fine-tune a generative model on limited amounts of domain-specific labels for adaptation. The fine-tuning follows the same procedure of dialog-act controlled pre-training, as described above, but can be employed using fewer labels, e.g., a few dozens of domain labels.

Characteristics of Semantically-Conditioned Generative Models

By training and tuning a generative model as disclosed herein, the following characteristics can be obtained.

Flexibility. In some implementations, generative models trained as disclosed herein can operate on a sequence of tokens without delexicalization, which means that these models do not assume a fixed one-hot or tree-structured dialog act representation vectors. Hence, such a generative model has great flexibility in extending to novel dialog acts.

Controllability. In contrast to previous techniques that generate natural sentences without high-level semantic guidance, semantically-conditioned generative models can generate sentences with adequate intent and slot-value information and maintain its fluency.

Generalizability. Semantically-conditioned generative models such as those disclosed herein may be able to generalize significantly better than other models, due to the pre-training on massive plain text corpora and annotated dialog datasets.

Data Augmentation

Having described how task-adapted generative models can be trained, the following describes how such models can be employed to generate training examples for natural language understanding models. Additional information on data augmentation and experimental results are available at Peng et al., *"Data Augmentation for Spoken Language Understanding via Pretrained Models,"* Aug. 29, 2020, available at: https://arxiv.org/abs/2004.13952, incorporated herein by reference and authored by certain inventors of this patent application.

To motivate the discussion, consider how a natural language understanding model can be integrated into a task-oriented spoken dialog system. In some cases, such a dialog system uses a pipeline architecture, where each dialog turn is processed using a multi-step procedure described below.

Transcriptions of user utterances are first passed to the natural language understanding model, where the user's intention and other key information are extracted. This information can then be formatted as input to dialog state tracking, which maintains the current state of the dialog. Outputs of the dialog state tracking can be passed to a dialog policy module, which produces a dialog act based on facts or entities retrieved from external resources (such as a database or a knowledge base). The dialog act emitted by the dialog policy module serves as the input to a natural language generation module, through which a system response in natural language is generated. The disclosed implementations provide a mechanism for training a natural language generation model that can be employed in such a dialog system, or that can produce training examples for training a natural language understanding model.

In spoken language understanding, the training data can be represented as N sample triples. Each triple contains: i) a tokenized utterance $x=(x_1, x_2, \ldots, x_T)$, ii) an intent label $y^i$, and iii) a slot label sequence $y=(y_1, y_2, \ldots, y_T)$.

In some scenarios, training data is limited, e.g., contains only a few human-labelled samples. To address this issue, the disclosed implementations can be employed for data augmentation. Given a combination of intents and slot-value pairs, the disclosed implementations can be employed to generate a number of corresponding utterances as synthetic data.

Formally, the input to a data augmentation module can be a dialog act $\mathcal{A}$, defined as the combination of intent I and P slot-value pairs $\{(s_i, v_i)\}_{i=1}^{P}$:

$$\mathcal{A} = [\underbrace{I}_{Intent}, \underbrace{(s_1, v_1), \ldots, (s_P, v_P)}_{Slot\text{-}value\,pairs}] \quad (1)$$

A generative model trained as disclosed herein can translate $\mathcal{A}$ into a natural language utterance $x=(x_1, x_2, \ldots, x_T)$. For example, suppose the intent is hotel-inform, and the slot-value pairs are (name=Hyatt, area=center, star=5), then a generated utterance can be "I have booked the 5-star Hyatt hotel in the center area for you."

However, training a generative model for data augmentation can involve a considerable amount of training data. As a consequence, a generative model that is trained using traditional techniques could be limited in model capacity and expressiveness if used for data augmentation.

The disclosed implementations can leverage semantically-conditioned generative models as described elsewhere herein. Such a generative model can quickly adapt to new domains with only a few domain-specific data samples, by fine-tuning on labelled training data. Some implementations can augment the dialogue acts in the training data by replacing/inserting/deleting slot values to create more combinations. The finetuned model then generates multiple candidate utterances for each dialogue act. Because the generated utterances may not always contain the required slot-value labels, some implementations can filter the utterances to remove any slot-value labels that are not provided by a requesting entity.

Data Augmentation Scenarios

The disclosed implementations can be employed in scenarios where a scant number of pairs of utterance and dialogue acts are available, denoted herein as Paired-Data. In addition, the following two semi-supervised scenarios that can arise in applications.

Rich-In-Ontology. In many cases, a detailed description of ontology of a dialogue domain is also given. Thus, the model is exposed to more valid dialogue acts. Formally, the training data consists of both labelled pairs and many dialogue acts: $\{(x_1, \mathcal{A}_1), \ldots, (x_N, \mathcal{A}_N), \mathcal{A}_{N+1}, \ldots, \mathcal{A}_M\}$. Under this scenario, a semantically-conditioned generative model can be fine-tuned as described above and used to generate utterances given these auxiliary dialogue acts.

Rich-In-Utterance. In some cases, a large number of unlabeled dialogue utterances are available. Formally, the training data consists of both labelled pairs and many unlabeled utterances: $\{(x_1, \mathcal{A}_1), \ldots, (x_N, \mathcal{A}_N), x_{n=1}, \ldots, x_m\}$. To utilize these utterances, a tuned model can be used to produce corresponding dialogue acts from utterances instead of producing utterances from dialogue acts. In this case, a generative model can be semantically-conditioned and fine-tuned in a reverse way: feed the model an utterance as input and train the model to generate the corresponding dialogue act. This can be implemented in both pretraining stage 120 and tuning stage 130. One way to describe this approach is as using a generative model to act as a language understanding module.

Example Data Augmentation Processing Flow

FIG. 5A illustrates an example processing flow 500 for synthetic corpus generation using paired-data only and/or rich-in-ontology data, and FIG. 5B illustrates an example processing flow 550 for synthetic corpus generation using rich-in-utterance data.

In processing flow 500, a pretrained model 501 is provided. For instance, the pretrained model can be obtained by performing pretraining stage 110, as described above. Next, labeled utterances 502 can be used for semantic conditioning 503, e.g., training the model to generate utterances given dialog acts. This results in a semantically-conditioned model 504. Labeled utterances 505 (e.g., task-specific seed examples) can be used for task tuning 506 to obtain a task-adapted model 507, as described above for tuning stage 130. Once the task-adapted model is ready, dialog acts 508 lacking corresponding utterances can be input to the task-adapted model to synthetic utterances. Next, corresponding pairs of dialog act labels and synthetic utterances are processed by filtering 509. The filtering can remove any synthetic utterances that lack corresponding intent or slot values from a predefined set for the task that the model is being tuned for. This results in a synthetic corpus 510 of labeled and filtered synthetic utterances.

Processing flow 550 is similar to processing flow 500, with some variations to accommodate rich-in-utterance scenarios. A pretrained model 551 is provided as described above. Next, labeled utterances 552 can be used for semantic conditioning 553, e.g., training the model to generate dialog acts given utterances, instead of to generate utterances given dialog acts as in processing flow 500. This results in a semantically-conditioned model 554. Labeled utterances 555 (e.g., task-specific seed examples) can be used for task tuning 556 to obtain a task-adapted model 557, again by tuning the model to generate dialog acts given example utterances. Once the task-adapted model is ready, unlabeled utterances 558 can be input to the task-adapted model to output corresponding synthetic dialog act labels for filtering 559. Here, utterances with low-confidence synthetic labels, e.g., with confidence below a specified confidence threshold, can be removed. The remaining utterances and corresponding synthetic labels can be included in a synthetic corpus 560 of synthetically-labeled and filtered utterances.

Example Data Augmentation for Paired-Data or Rich-In-Ontology Scenarios

Figure 6:
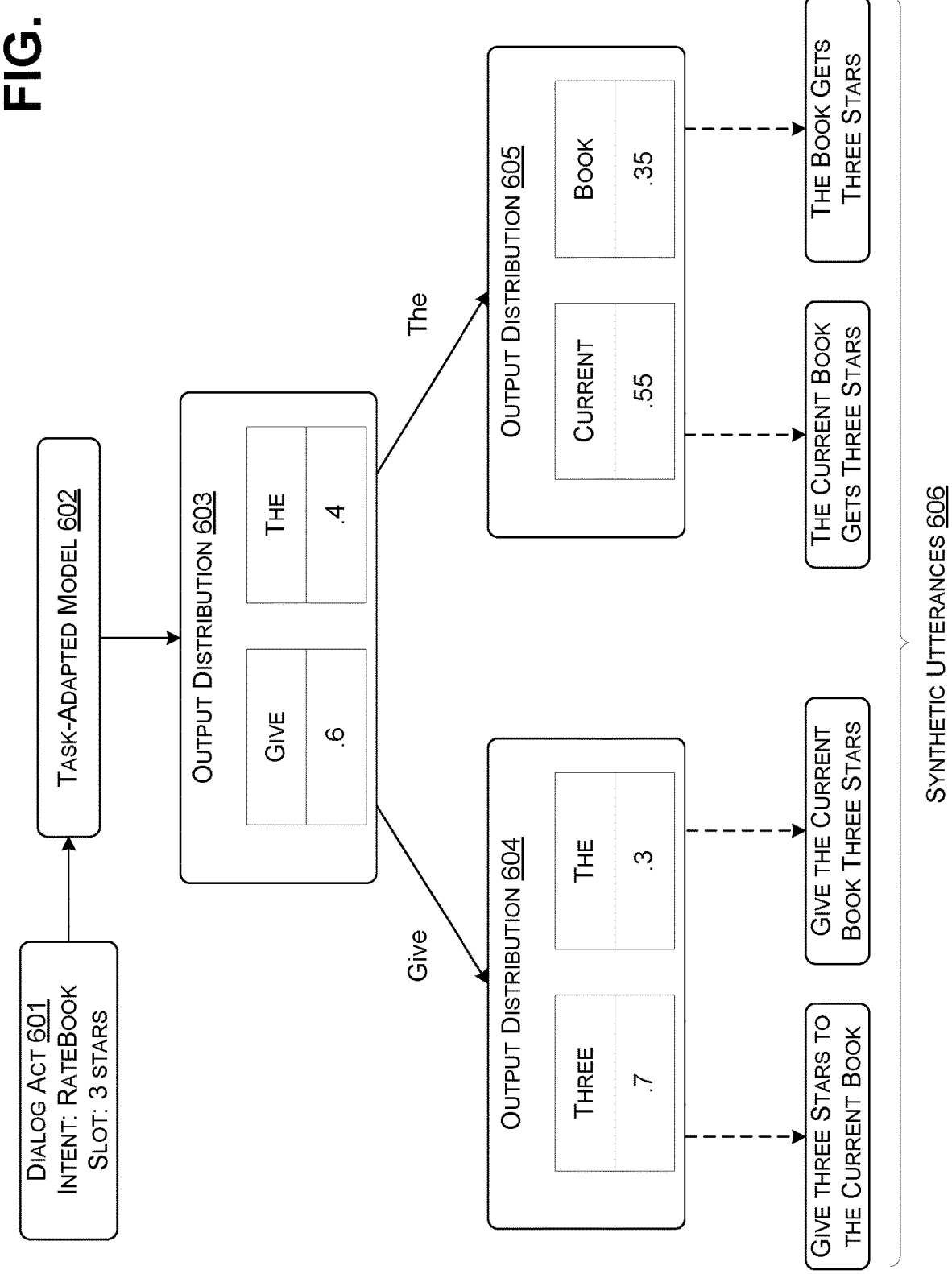
FIG. 6 illustrates an example of using a dialog act as an input to a generative model to generate synthetic utterances, consistent with some implementations of the present concepts.

FIG. 6 illustrates an example of how a given input dialog act can be used to generate multiple synthetic utterances. Assume for the purposes of the following examples that a generative model has been tuned to generate synthetic utterances for rating various items, such as books, movies, or consumer electronic items.

Here, dialog act 601 includes the intent to rate a book and the slot value is three stars. A task-adapted model 602 produces an output distribution 603 indicating the first token is "Give" with a probability of 0.6 and "The" with a probability of 0.4. Both predicted tokens can be retained and used as context vectors for another iteration of token generation by the model. For the context token "give," the model produces an output distribution 604 indicating that the predicted next token is "three" with a probability of 0.7 and "the" with a probability of 0.3. For the context token "the," the model produces an output distribution 605 indicating that the predicted next token is "current" with a probability of 0.55 and "book" with a probability of 0.35.

This process can continue, e.g., enumerating each sequence of predicted next tokens to generate synthetic utterances 606. Thus, in this example, the synthetic utterances starting with "give" can include "Give three stars to the current book" and "Give the current book three stars." Similarly, synthetic utterances starting with "The" can include "The current book gets three stars" and "The book gets three stars."

In this manner, diverse synthetic utterances for a given dialog act can be generated. In some cases, not all tokens predicted at each step are necessarily used for the output utterances. Rather, predicted tokens can be sampled from the output distribution according to some criteria. For instance, some implementations may employ a probability threshold cutoff and not provide utterances having predicted tokens with probabilities below the cutoff. For example, given a probability threshold of 0.32, the sentence "Give the current book three stars" would not be output, since the probability of "the" as the second word is below this threshold. In other implementations, the top-N predicted tokens output by the model may be used for synthetic utterances and other tokens may be discarded.

Example Data Augmentation for Rich-In-Utterance Scenarios

As noted above, in some scenarios, a generative model can be trained in a reverse manner to generate predicted dialog acts given an input sentence. In this case, the model can be employed to label a corpus of unlabeled task-specific utterances for subsequent training of a natural language understanding model.

Figure 7:
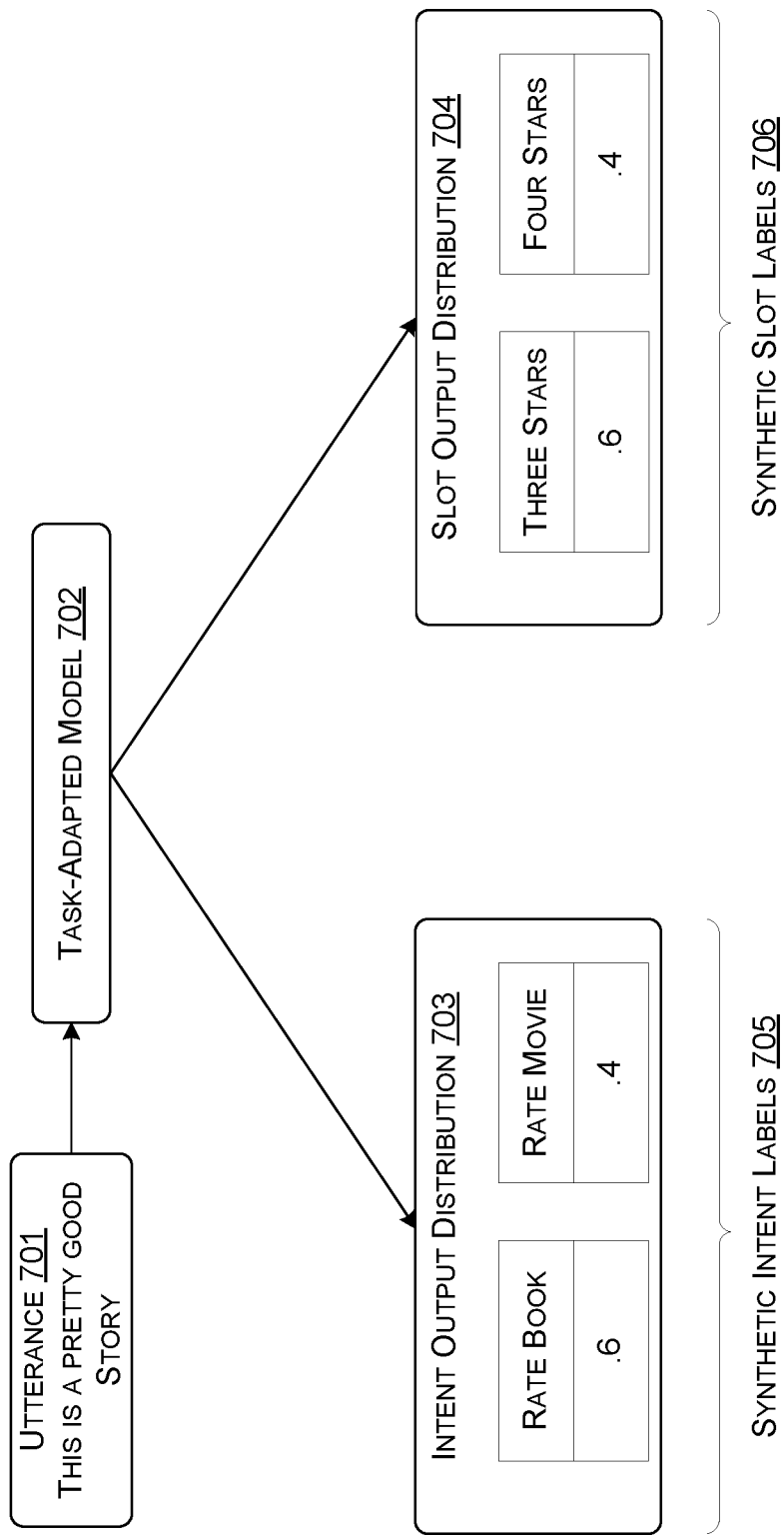
FIG. 7 illustrates an example of using utterances as inputs to a generative model to generate synthetic dialog act labels, consistent with some implementations of the present concepts.

FIG. 7 shows an example of how an input utterance can be provided with synthetic labels. Here, input utterance 701 states that "This is a pretty good story." The intent is somewhat ambiguous as the term "story" can reasonably apply to either a book or a movie. Thus, the task-adapted model 702 can produce an intent output distribution 703 with the probability of 0.6 for rate book and 0.4 for rate movie. Likewise, the term "pretty good" might correspond to a three- or four-star review. Thus, the slot output distribution 704 is 0.6 for three stars and 0.4 for four stars.

In this example, "rate book" and "rate movie" are synthetic intent labels 705, and "three stars" and "four stars" are synthetic slot labels 706. In some implementations, only the labels with the highest probabilities are retained for corpus generation purposes. Thus, in this case, the utterance "This is a pretty good story" could be labeled as a three-star review of a book.

Example System

Figure 8:
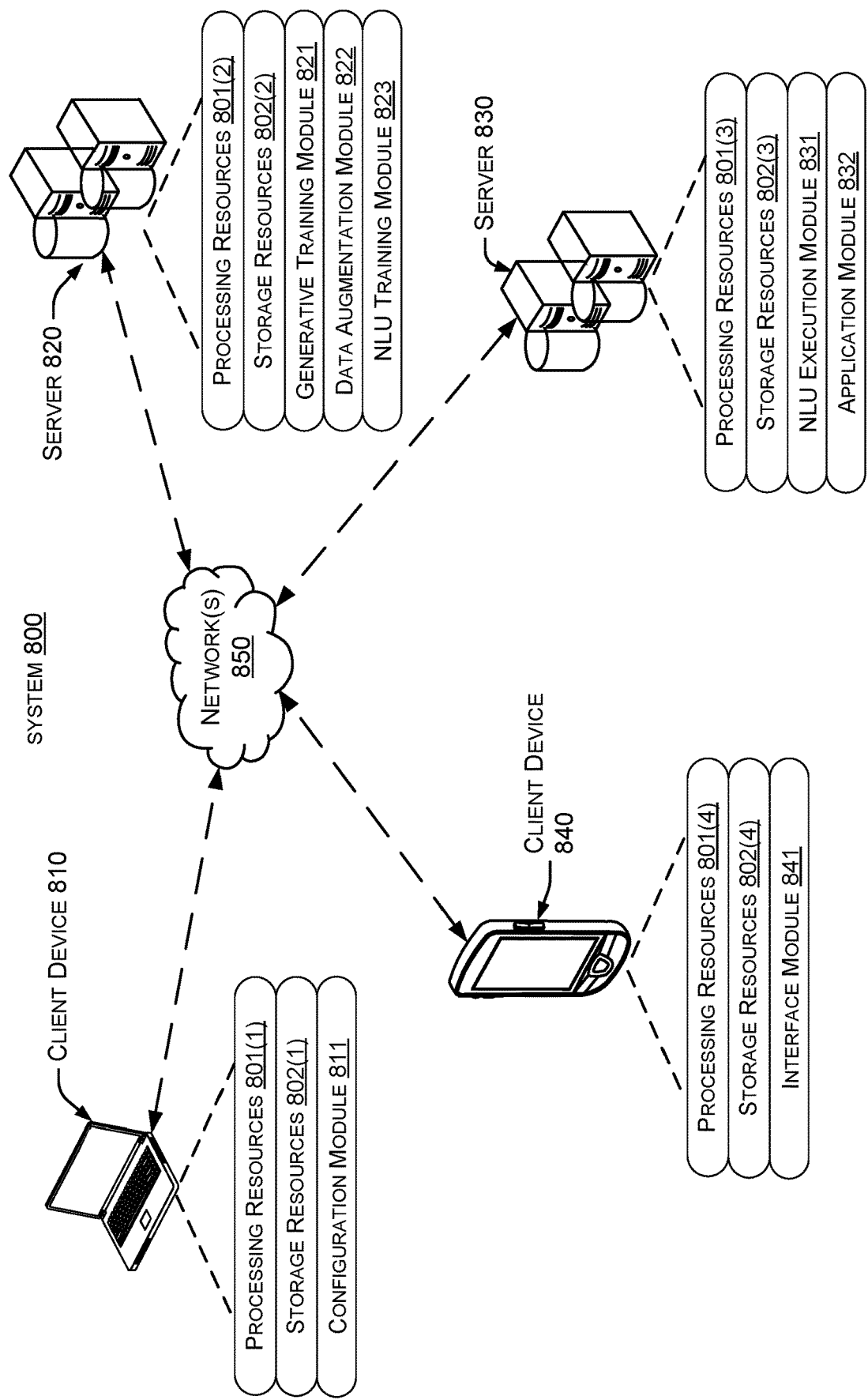
FIG. 8 illustrates an example system in which the present concepts can be employed, consistent with some implementations of the present concepts.

The present implementations can be performed in various scenarios on various devices. FIG. 8 shows an example system 800 in which the present implementations can be employed, as discussed more below.

As shown in FIG. 8, system 800 includes a client device 810, a server 820, a server 830, and a client device 840, connected by one or more network(s) 850. Note that the client devices can be embodied both as mobile devices such as smart phones and tablets, as well as stationary devices such as desktops, server devices, etc. Likewise, the servers can be implemented using various types of computing devices. In some cases, any of the devices shown in FIG. 8, but particularly the servers, can be implemented in data centers, server farms, etc.

Certain components of the devices shown in FIG. 8 may be referred to herein by parenthetical reference numbers. For the purposes of the following description, the parenthetical (1) indicates an occurrence of a given component on client device 810, (2) indicates an occurrence of a given component on server 820, (3) indicates an occurrence of a given component on server 830, and (4) indicates an occurrence of a given component on client device 840. Unless identifying a specific instance of a given component, this document will refer generally to the components without the parenthetical.

Generally, the devices 810, 820, 830, and/or 840 may have respective processing resources 801 and storage resources 802, which are discussed in more detail below. The devices may also have various modules that function using the processing and storage resources to perform the techniques discussed herein. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Client device 810 can include a configuration module 811 that can interact with various modules on server 820, such as generative training module 821, data augmentation module 822, and natural language understanding (NLU) training module 823. Generally speaking, the configuration module can provide certain configuration parameters to the server 820. The configuration parameters can include task-specific training data for training a natural language understanding model.

The NLU training module 823 can evaluate the task-specific training data to determine whether sufficient task-specific examples are available to train a task-adapted NLU model. If not, e.g., the number of task-specific examples is below a threshold minimum number, the NLU training module can output a response indicating that additional task-specific training examples are appropriate and/or that data augmentation services are available to generate synthetic training examples. If the offer is accepted, the generative training module can produce a semantically-conditioned generative model as described above and tune the model to obtain a task-adapted generative model. Then, the data augmentation module 822 can use the domain-adapted generative model to generate synthetic task-specific examples. The synthetic examples can be used by the NLU training module to train an NLU model, with or without the training examples that were initially provided.

In some cases, the NLU model is specified by the configuration data provided by the configuration module. The configuration data can include architecture parameters and training parameters (e.g., hyperparameters). The architecture parameters can specify the structure of an NLU model to be generated, e.g., the number of nodes, arrangement of the nodes in layers, connectivity of the nodes and/or layers, etc. The architecture parameters can also specify input data and output data for each node and/or layer.

The configuration parameters can also include training parameters that specify information such as learning rates, number of training iterations, or other hyperparameters. The NLU training module 823 uses these training configuration parameters to perform model training functionality on a model specified by the architecture parameters. For instance, the NLU training module can use a transformer-based model having stacked transformer encoders, such as BERT. Additional details on BERT can be found in Jacob Devlin, Ming-Wei Chang, Kenton Lee, and Kristina Toutanova, "BERT: Pre-training of deep bidirectional transformers for language understanding," 2018, arXiv preprint, arXiv:1810.04805.

The NLU training module 823 can output a trained NLU model to server 830. NLU execution module 831 can execute the trained NLU model in response to received inputs. For example, interface module 841 on client device 840 can provide input data to an application module 832 executing on server 830. The application module can invoke the NLU execution module to evaluate the input data. The NLU model execution module can process the uploaded input data using the trained NLU model and provide output of the trained NLU model to the application module. The application module can provide the output directly to the client device 840 over network(s) 850, or can perform further processing of the output before sending a response to the client device. For instance, the application module might implement dialog tracking and conduct a dialog with a user of client device 840 using the trained NLU model to infer intent and slot values for utterances provided by the user.

Example Data Augmentation And NLU Model Training Method

Figure 9:
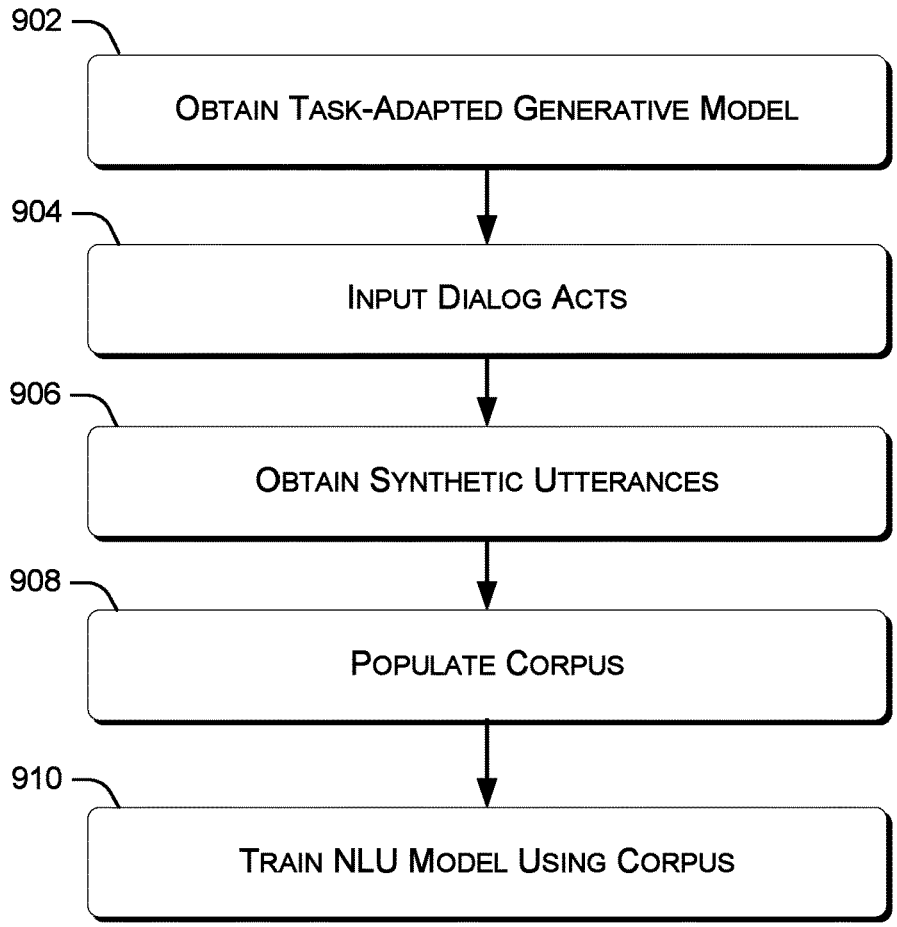
FIG. 9 illustrates an example method or technique for generating synthetic training examples and training a natural language understanding model, consistent with some implementations of the present concepts.

FIG. 9 illustrates an example method 900, consistent with the present concepts. As discussed more below, method 900 can be implemented on many different types of devices, e.g., by one or more cloud servers, by a client device such as a laptop, tablet, or smartphone, or by combinations of one or more servers, client devices, etc.

Method 900 begins at block 902, where a task-adapted generative model is obtained. The task-adapted generative model can be a neural-network based model with one or more layers that map components of training examples (e.g., tokens, sentences, phrases, etc.) into first representations in a space. The training examples can include sequences of words or tokens, such as documents, paragraphs, or sentences, and the components can include the words or tokens themselves. In some cases, block 902 involves performing pretraining stage 110, and/or receiving a pretrained generative model on which pretraining stage 110 has already been performed.

Method 900 continues at blocks 904, where dialog acts are input to the task-adapted generative model. For example, the dialog acts can be taken from a predetermined set of dialog acts for a specific task. For instance, an entity that requests a synthetic training corpus and/or a trained NLU model can provide the predetermined set of dialog acts.

At block 906, synthetic utterances are obtained from the task-adapted generative model. For example, output distributions of the model can be sampled as described previously. Each synthetic utterance can be paired with a corresponding dialog act that was input to the generative model to produce that synthetic utterance.

At block 908, a synthetic training corpus is populated with synthetic training examples that include the synthetic utterances and the dialog acts. In some implementations, the synthetic training examples are filtered, e.g., to remove any synthetic utterances that lack dialog acts from the predetermined set.

Method 900 continues at block 910, where a natural language understanding model is trained using the synthetic training corpus. In some cases, the natural language understanding model is trained only using the examples in the synthetic training corpus. In other cases, human-labeled examples, such as those used to tune the generative model, can also be used at block 910.

In some implementations, blocks 902, 904, 906, and 908 are performed by data augmentation module 822, and block 910 is performed by NLU training model 823.

Example Generative Model Pretraining and Tuning Method

Figure 10:
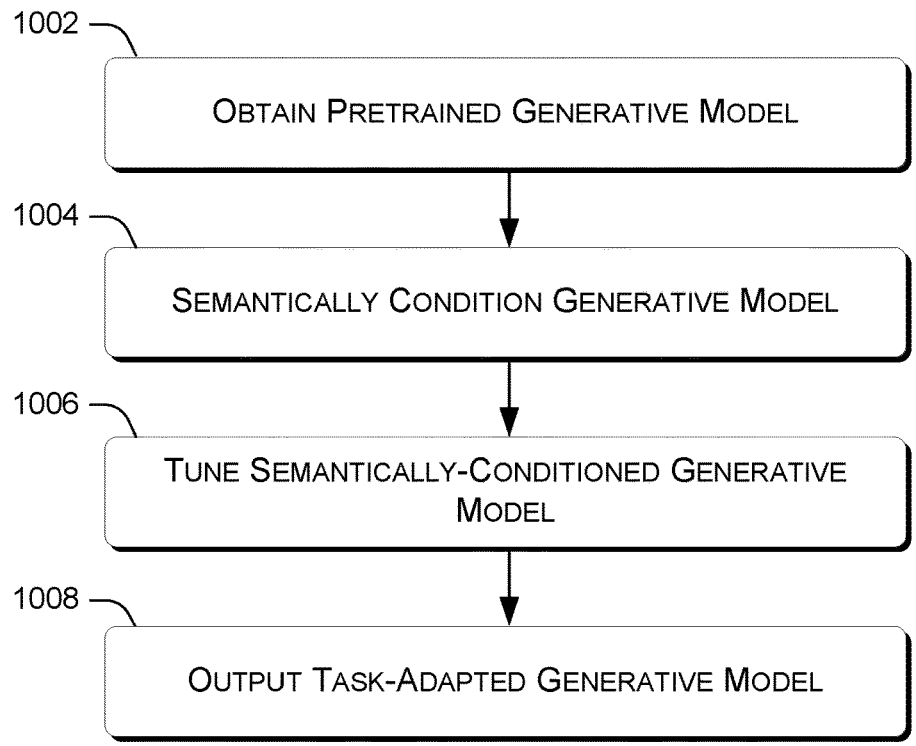
FIG. 10 illustrates an example method or technique for generating a task-adapted generative model, consistent with some implementations of the present concepts.

FIG. 10 illustrates an example method 1000, consistent with the present concepts. As discussed more below, method 1000 can be implemented on many different types of devices, e.g., by one or more cloud servers, by a client device such as a laptop, tablet, or smartphone, or by combinations of one or more servers, client devices, etc.

Method 1000 begins at block 1002, where a pretrained generative model is obtained as described above with respect to block 902 of method 900. The pretrained generative model may have been pretrained with a first training data set of unlabeled training examples.

Method 1000 continues at block 1004, where the generative model is semantically conditioned. For instance, block 1004 can involve performing pretraining stage 120 on a pretrained generative model. This can involve using a second training data set having dialog act-labeled utterances.

Method 1000 continues at block 1006, where the semantically-conditioned generative model is tuned with the task-specific seed examples to obtain a task-adapted generative model. For instance, block 1006 can involve performing tuning stage 130 on a semantically conditioned generative model. This can involve using a third training data set having task-specific seed examples, each of which includes one or more task-specific dialog act labels and corresponding utterances.

Method 1000 continues at block 1008, where the task-adapted generated model is output. For instance, the task-adapted model can be sent over a network to a requesting entity or provided to a local module for execution.

In some implementations, method 1000 is performed by generative training module 821.

Example User Experiences

The following describes several user experiences that can be provided in some implementations.

Figure 11:
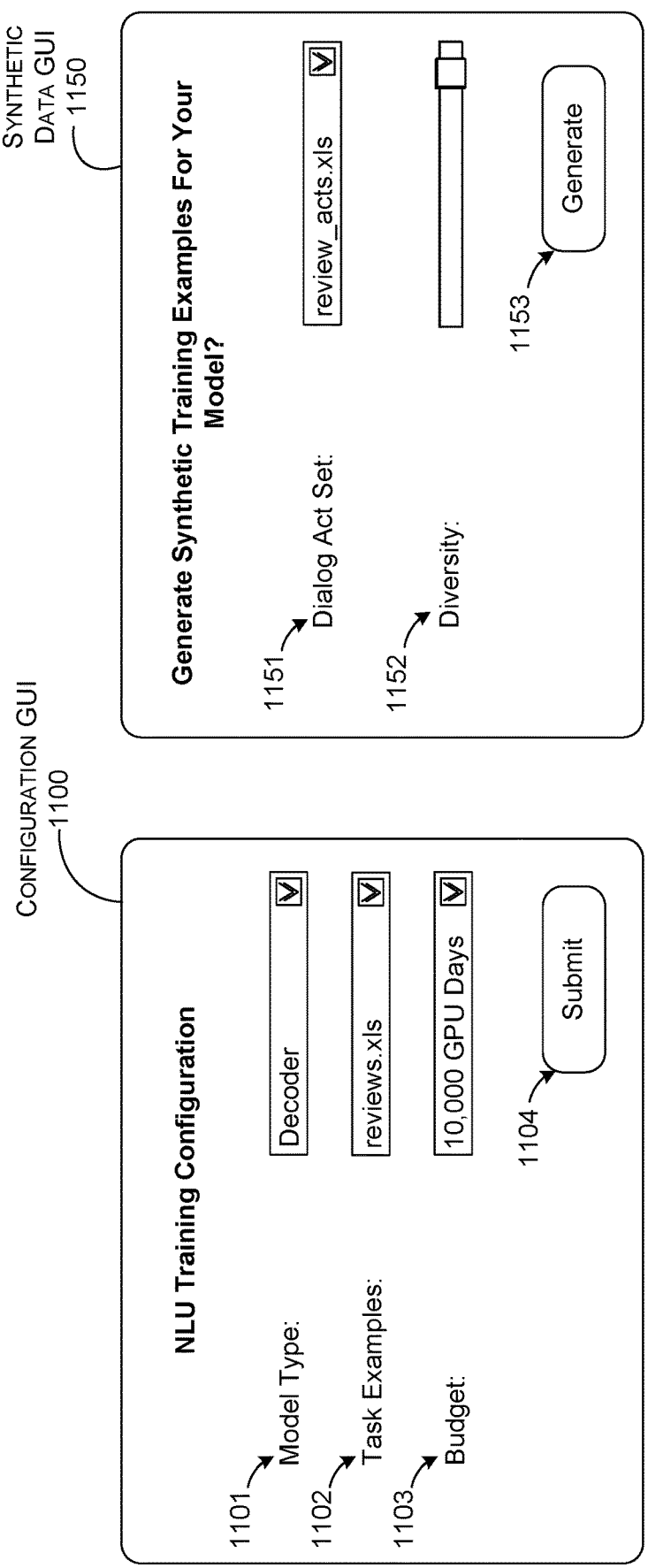
FIGS. 11 and 12 illustrate example user experiences and user interfaces, consistent with some implementations of the present concepts.

FIG. 11 illustrates a configuration GUI 1100 for configuring a request for a trained NLU model and a synthetic example GUI 1150 for requesting synthetic training examples. For instance, server 820 might provide GUIs 1100 and 1150 to a user of client device 810 in the course of generating a natural language understanding model for the user.

Configuration GUI 1100 includes the following fields. Model type field 1101 identifies the type of NLU model being requested. Here, the user has requested a decoder-based NLU model be generated. Other options might include an LSTM or other recurrent neural network model. Task examples field 1102 allows the user to upload a file of task-specific training examples. Budget 1103 allows the user to specify a training budget in GPU days. When the user clicks submit button 1104, a request is sent to the NLU training module 823 on server 820.

In instances when the user has provided sufficient examples for training an NLU model, the NLU training module 823 can proceed to train the model for the user. In other instances, the NLU training module can detect that there are insufficient examples, and offer the user the opportunity to use synthetic training examples instead. In this case, the user might be presented with synthetic example GUI 1150. For instance, the synthetic example GUI can include a dialog act set field 1151 that allows the user to specify a file having a defined set of dialog acts that can be used for synthetic utterance generation and/or filtering, as described herein. Diversity field 1152 allows the user to adjust the amount of diversity in the synthetic training examples, e.g., with relatively greater diversity corresponding to relatively lower sampling threshold cutoffs or relatively higher values of N for top-N sampling as described above.

When the user clicks the generate button 1153, the generative training module 821 can generate or tune a task-adapted generative model using the task examples provided at 1102 as seed examples. Then, the data augmentation module can input the dialog acts provided via field 1151 to the task-adapted generative model to generate a synthetic corpus. Thereafter, the NLU training module 823 can train an NLU model for the user with the synthetic training examples.

Figure 12:
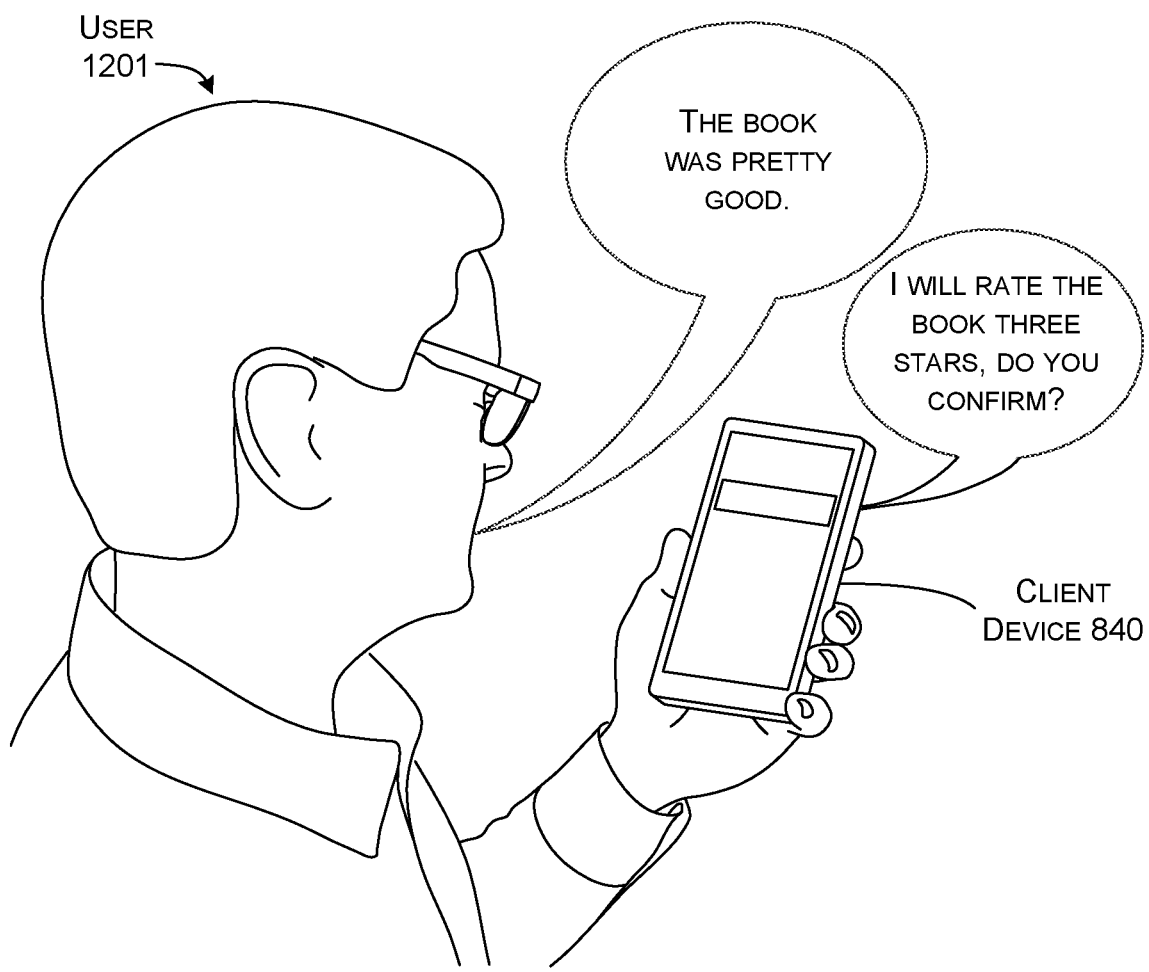

FIG. 12 illustrates an example user experience for a user 1201 of client device 840 that has access to a natural language understanding model that has been trained using a synthetic corpus as described above. Here, the user has stated that "The book was pretty good." The NLU model can infer that this phrasing typically corresponds to a three-star review, and the user can be requested to confirm this is correct.

Device Implementations

As noted above with respect to FIG. 8, system 800 includes several devices, including a client device 810, a server 820, a server 830 and a client device 840. As also noted, not all device implementations can be illustrated, and other device implementations should be apparent to the skilled artisan from the description above and below.

The term "device", "computer," "computing device," "client device," and/or "server device" as used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on storage, such as storage/memory and/or the datastore. The term "system" as used herein can refer to a single device, multiple devices, etc.

Storage resources can be internal or external to the respective devices with which they are associated. The storage resources can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods and functionality described herein can be performed on a single computing device and/or distributed across multiple computing devices that communicate over network(s) 850. Without limitation, network(s) 850 can include one or more local area networks (LANs), wide area networks (WANs), the Internet, and the like.

Various examples are described above. Additional examples are described below. One example includes a method comprising obtaining a task-adapted generative model that has been tuned using one or more task-specific seed examples, inputting dialog acts into the task-adapted generative model, obtaining synthetic utterances that are output by the task-adapted generative model, and populating a synthetic training corpus with synthetic training examples that include the synthetic utterances, the synthetic training corpus suitable for training a natural language understanding model.

Another example can include any of the above and/or below examples where each of the synthetic training examples comprise a particular synthetic utterance and a particular dialog act that was input to the task-adapted generative model to generate the particular synthetic utterance.

Another example can include any of the above and/or below examples where the dialog acts comprising intent values and slot values.

Another example can include any of the above and/or below examples where obtaining the synthetic utterances comprises sampling tokens from an output distribution of the task-adapted generative model.

Another example can include any of the above and/or below examples where the method further comprises training the natural language understanding model using the synthetic training corpus.

Another example can include any of the above and/or below examples where the task-adapted generative model comprises one or more transformer decoders and the natural language understanding model comprises one or more transformer encoders.

Another example can include any of the above and/or below examples where the method further comprises receiving a request to train the natural language understanding model, receiving the task-specific seed examples for generating the natural language understanding model, determining whether additional task-specific examples are appropriate for training the natural language understanding model, and populating the synthetic training corpus in an instance when additional task-specific examples are determined to be appropriate for generating the natural language understanding model.

Another example can include any of the above and/or below examples where the method further comprises outputting an offer to generate the synthetic training corpus responsive to a determination that additional task-specific examples are appropriate for generating the natural language understanding model and populating the synthetic training corpus responsive to acceptance of the offer.

Another example includes a system comprising a processor and a storage medium storing instructions which, when executed by the processor, cause the processor to: using a task-adapted generative model tuned for a particular task, generate synthetic training examples for the particular task, and populate a synthetic training corpus with the synthetic training examples.

Another example can include any of the above and/or below examples where the instructions, when executed by the processor, cause the processor to sample predicted next tokens from an output distribution of the task-adapted generative model to provide a diverse set of synthetic training examples.

Another example can include any of the above and/or below examples where the instructions, when executed by the processor, cause the processor to receive input designating a requested diversity of the synthetic training examples and sample the output distribution based at least on the requested diversity.

Another example can include any of the above and/or below examples where the instructions, when executed by the processor, cause the processor to select a specified number of predicted next tokens from the output distribution based at least on the requested diversity.

Another example can include any of the above and/or below examples where the instructions, when executed by the processor, cause the processor to select predicted next tokens having respective probabilities above a probability threshold from the output distribution, the probability threshold corresponding to the requested diversity.

Another example can include any of the above and/or below examples where the instructions, when executed by the processor, cause the processor to identify a defined set of slot values for the synthetic training corpus and filter out synthetic training examples produced by the task-adapted generative model that lack corresponding slot values from the defined set.

Another example can include any of the above and/or below examples where the instructions, when executed by the processor, cause the processor to train a natural language understanding model using the synthetic training corpus.

Another example includes a method comprising obtaining a pretrained generative model that has been pretrained using a first training data set having unlabeled training examples, semantically conditioning the pretrained generative model based at least on a second training data set having dialog act-labeled utterances to obtain a semantically-conditioned generative model, tuning the semantically-conditioned generative model using a third training data set having task-specific seed examples to obtain a task-adapted generative model, and outputting the task-adapted generative model.

Another example can include any of the above and/or below examples where wherein the semantically conditioning comprises inputting individual dialog acts from the second training data set to the pretrained generative model and training the pretrained generative model to generate corresponding utterances that are labeled with the individual dialog acts.

Another example can include any of the above and/or below examples where the tuning comprises inputting individual task-specific dialog acts from the third training data set to the semantically-conditioned generative model and training the semantically-conditioned generative model to generate corresponding task-specific utterances that are labeled with the individual task-specific dialog acts.

Another example can include any of the above and/or below examples where the semantically conditioning and the tuning comprise performing next token prediction.

Another example can include any of the above and/or below examples where the third training data set includes slot labels that are not present in the second training data set.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A method comprising:
obtaining a pretrained generative model that has been pretrained using a first training data set having unlabeled training examples;
semantically conditioning the pretrained generative model based at least on a second training data set having dialog act-labeled utterances to obtain a semantically-conditioned generative model; and
outputting the semantically-conditioned generative model.

2. The method of claim 1, wherein the semantically-conditioned generative model comprises one or more transformer decoders that are semantically conditioned based at least on the dialog act-labeled utterances.

3. The method of claim 2, wherein semantically conditioning the pretrained generative model comprises:
inputting, to the pretrained generative model, a token from a particular utterance from the second training data set that is labeled with a particular dialog act;
predicting a subsequent token of the particular utterance using the pretrained generative model; and
adjusting parameters of the one or more transformer decoders based at least on whether the predicted subsequent token matches an actual subsequent token of the particular utterance.

4. The method of claim 3, wherein the particular dialog act includes a particular intent value and a particular slot value, and the predicting of the subsequent token is conditioned on the particular intent value and the particular slot value.

5. The method of claim 1, wherein the second training data set includes dialog act-labeled utterances from a plurality of different task domains.

6. The method of claim 5, wherein the plurality of different task domains includes at least a food ordering domain and a travel domain.

7. The method of claim 1, wherein the semantically-conditioned generative model is adapted, by the semantically conditioning, to conduct dialogs with users.

8. The method of claim 7, wherein the semantically-conditioned generative model is adapted to output synthetic training examples suitable for populating a synthetic training corpus.

9. A system comprising:
a processor; and
a storage medium storing instructions which, when executed by the processor, cause the processor to:
using a semantically-conditioned generative model trained to conduct dialogs with users, generate synthetic training examples; and
output the synthetic training examples into a synthetic training corpus.

10. The system of claim 9, wherein the instructions, when executed by the processor, cause the processor to:
receive a specific dialog act comprising a specific intent value and a specific slot value; and
using the semantically-conditioned generative model, generate multiple different synthetic training examples labeled with the specific dialog act.

11. The system of claim 10, wherein the instructions, when executed by the processor, cause the processor to:
select individual tokens of the multiple different synthetic training examples from an output distribution of the semantically-conditioned generative model based at least on the individual tokens having respective probabilities exceeding a threshold; and
discard at least one other token from the output distribution having a probability that does not exceed the threshold.

12. The system of claim 11, wherein the instructions, when executed by the processor, cause the processor to:
receive user input identifying a defined set of slot values for the synthetic training corpus; and
filter out synthetic training examples produced by the semantically-conditioned generative model that lack corresponding slot values from the defined set.

13. The system of claim 10, wherein the instructions, when executed by the processor, cause the processor to:
select a specified number of top tokens from an output distribution of the semantically-conditioned generative model to obtain the multiple different synthetic training examples; and
discard at least one other token from the output distribution.

14. The system of claim 10, wherein the instructions, when executed by the processor, cause the processor to:
train a natural language understanding model using the synthetic training corpus.

15. A method comprising:
obtaining a semantically-conditioned generative model that has been pretrained based at least on a first training data set having unlabeled training examples and semantically conditioned based at least on a second training data set having dialog act-labeled utterances;
inputting dialog acts into the semantically-conditioned generative model;

obtaining synthetic utterances that are output by the semantically-conditioned generative model; and
outputting the synthetic utterances.

16. The method of claim 15, wherein the semantically-conditioned generative model comprises one or more transformer decoders that have been semantically conditioned based at least on the dialog act-labeled utterances.

17. The method of claim 16, wherein the semantically-conditioned generative model comprises at least two transformer decoders each having a feed-forward layer and a masked self-attention layer.

18. The method of claim 17, further comprising:
receiving input specifying a set of dialog acts to input to the semantically-conditioned generative model.

19. The method of claim 18, further comprising:
outputting a graphical user interface having a field for specifying the set of dialog acts; and
receiving the input via the field of the graphical user interface.

20. The method of claim 17, further comprising:
sampling predicted next tokens from an output distribution of the semantically-conditioned generative model to obtain the synthetic utterances.

21. The method of claim 20, further comprising:
receiving input designating a requested diversity of the synthetic utterances; and
sampling the output distribution based at least on the requested diversity.

22. The method of claim 21, further comprising:
outputting a graphical user interface having a field for specifying the requested diversity; and
receiving the input via the field of the graphical user interface.

\* \* \* \* \*